Jan. 27, 1970   TOKUITI KURAISI   3,492,517

END CLOSURE FOR CASING OF SMALL DYNAMO-ELECTRIC MACHINE

Filed Jan. 26, 1968

INVENTOR.
TOKUITI KURAISI

United States Patent Office 3,492,517
Patented Jan. 27, 1970

3,492,517
END CLOSURE FOR CASING OF SMALL
DYNAMO-ELECTRIC MACHINE
Tokuiti Kuraisi, 65 Takaishikamimachi,
Ichikawa, Japan
Filed Jan. 26, 1968, Ser. No. 700,935
Int. Cl. H02k 5/16
U.S. Cl. 310—89                                 3 Claims

ABSTRACT OF THE DISCLOSURE

An end closure for the casing of an electric motor in which a flange is formed together with the casing into a single body, and the closure is provided by press-inserting a disc having rotor bearing portion, in the opening of the casing. Further, the disc has projecting portions to be engaged by removing tools in extracting the disc from the closing.

BRIEF SUMMARY OF THE INVENTION

This invention relates to the improvement of an electric motor, and, more in particular, this invention relates to a miniature electric motor having flanges containing an opening which is closed by a disc press-fitted into the flange.

In a conventional electric motor having flange, a bolt is passed through the yoke portion of the stator in fitting the flange onto the body, and the flange is fixed by the bolt.

Since such a bolt is passed through the stator, the rotor is mechanically restricted, and the output of the electric motor is lowered when compared with the size of its motor.

The object of this invention is to provide a miniature electric motor having a flange which does not embody the disadvantages of conventional electric motors with a flange.

Another object of this invention is to provide an electric motor with a flange which comprises providing a flange on the end portion of the motor casing in such a manner that the flange is formed in single body along with the casing, and press-inserting a disc into the flange with the disc incorporating bearing means for the rotary shaft of motor.

Another object of this invention is to provide an electric motor which comprises providing flange about the periphery of an opening in the casing of the motor in such a manner that the flange forms a single body along with the casing, press-inserting a disc having the bearing portion for, a rotary shaft of the motor into the above mentioned opening, and providing the disc with the projecting portions for engagement with a removing tool for disconnecting the disc from the opening.

In accordance with the electeric motor of this invention, it is possible to remove the drawbacks of the conventional electric motors with flange.

DETAILED EXPLANATION OF THE INVENTION

Figure 1:
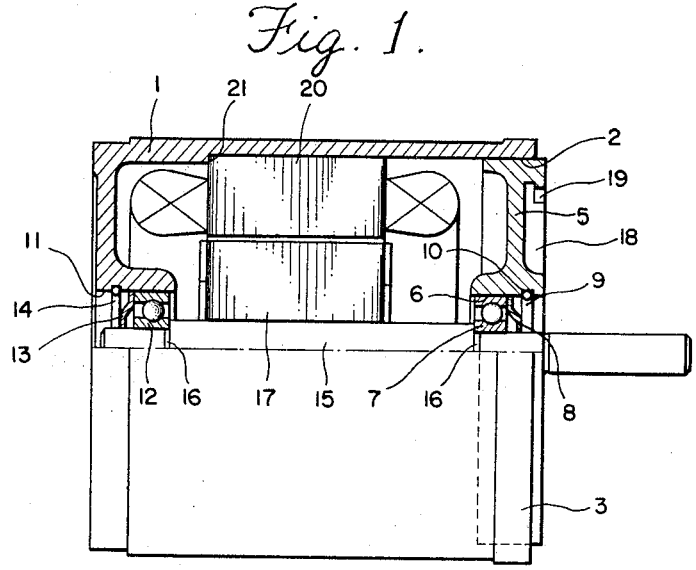
FIG. 1 is a side view partly in section of an electric motor in accordance with the present invention.
Figure 2:
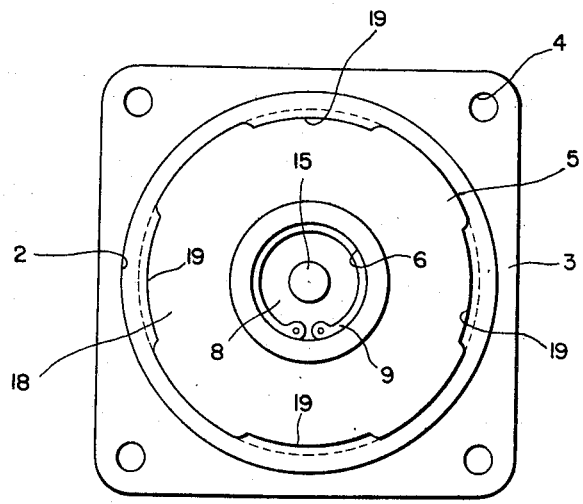
FIG. 2 is a front view of the electric motor illustrated in FIG. 1.

In the drawing, 1 is the casing, and one end of the casing is closed, and the other end of the casing has opening 2, and in most cases, the casing is made of metal, but other hard materials, such as synthetic resin, can be used to form the casing. 3 is a flange provided about the periphery in the opening of the end of the casing 1 and the bolt holes 4 are provided on the flanges so that the casing 1 can be fitted to other apparatus by means of the flange. 5 is a disc, and the external diameter thereof is equal to or slightly larger than the internal diameter of the opening 2. 6 is an opening which is provided in the center of the disc 5, and a bearing 7 is inserted into the opening. 8 is a spring washer for the bearing 7, and 9 is a snap ring, which is inserted into the groove 10 provided on the internal wall forming the opening 6. The bearing of the same structure as above is provided on the opposite end of the casing 1. In other words, the bearing 12, the bearing spring washer 13, and the snap ring 14 are inserted into the opening 11. The rotary shaft 15 is supported by the above mentioned bearings 7 and 12, and the bearings 7 and 12 are fitted to the stage portion 16 of the rotary shaft 15. The rotor 17 is provided on the rotary shaft 15. 18 is a concave portion formed on the outer surface of the disc 5, and projecting portions 19 are formed along with the disc extending inwardly from the periphery of the concave portion. A plurality of the projected portions 19 are symmetrically arranged about the periphery of the concave portion 18.

20 is a stator, and the stator is press-inserted into the casing 1, and is fitted to the staged portion 21 on the internal wall of the casing, and the proper position is retained.

The electric motor of this invention is composed in such a manner that the stator 20 and the rotor 17 are contained in the casing 1 spaced from the opening 2, and one end of the shaft 15 of the rotor 17 is supported by the bearing 12, and then the bearing 7 supported within the disc 5 is inserted onto the other end of the shaft 15, and the disc 5 is press-inserted into the opening 2.

In assembling the motor, the casing 1 is heated at a temperature ranging from 70 to 80° C., and the disc 5 is retained at room temperature and can be press-inserted into the opening 2 of the casing 1. It is also possible to press-insert the casing 1 and the disc 5 at room temperature.

When the disc 5 is press-inserted while it is cold into the casing 1 whose opening 2 has the internal diameter of 80 mm., and about 300 kg. of load is given thereto.

After having press-inserted the disc 5 into the casing 1, the disc 5 can be removed for inspecting the interior of the motor or for exchanging its internal parts. When the disc 5 is to be removed a removing tool is fitted to the above mentioned projecting portions 19, and the removing tool is pulled in the axial direction. When the disc is pulled out, it is necessary to employ a pull of about 100 kg. when the internal diameter of the opening 2 is 80 mm.

In regard to the removing tool which is used in pulling out the disc 5, removing tools of any type can be used if only they have the means for simultaneously engaging more than two of the above mentioned projecting portions 19.

The electric motor of this invention has the above described structure, and therefore it can effectively make use of the magnetic forces of the stator 20 and the rotor 17, and it is possible to increase the output by about 60% when compared with the conventional electric motors of the same type.

In conventional electric motors of this type, mechanical strains are developed in the flange attributable to the binding of the bolt, and these strains affect the ball bearing, and cause it to make noise. Accordingly, with this invention, bolts or other binding means are not used at all, and, therefore, the noise of the bearing is remarkably improved, the time required for assemblage is shortened, and this invention is advantageous for the mass production of the electric motors.

What is claimed is:
1. A small-size dynamoelectric machine comprising a casing having a pair of oppositely disposed ends, a flange formed integral with said casing and framing one of said ends and forming an opening into said casing, said flange extending outwardly from the sides of said casing, a disc being inserted with a press-fit into the opening formed in the end of said casing framed by said flange, aligned bearing means being positioned within said disc and in the end of said casing opposite said disc, a rotary shaft positioned within said casing and journalled into said bearing means, a rotor secured said shaft, a stator laterally enclosing said rotor within said casing, said disc having a concave recess formed in the exterior surface thereof and concentrically arranged about the center of said disc, and a plurality of projections formed on said disc on the outer circumferential periphery of said recess and extending radially inwardly therefrom, 2. A small-size dynamoelectric machine, as set forth in claim 1, wherein said flange in a plane transverse to the axis of said shaft being square in shape and the length of each side of said flange being greater than the length of a side of said casing.

3. A small-size dynamoelectric machine, as set forth in claim 1, wherein said projections being equally angularly spaced about the outer circumferential periphery of said recess, the inner surfaces of said projections being spaced from the oppositely disposed surface of said recess forming a flange-like member for engaging a tool for removing said disc from the opening in said casing.

References Cited
UNITED STATES PATENTS

| | | | |
|---|---|---|---|
| 2,464,017 | 3/1949 | Berghorn | 310—258 |
| 2,650,992 | 9/1953 | Forss et al. | 310—42 |
| 2,795,713 | 6/1957 | Woll et al. | 310—254 |
| 3,310,691 | 3/1967 | Wilkinson | 310—42 |

WARREN E. RAY, Primary Examiner

U.S. Cl. X.R.

310—42, 90